United States Patent
Pazos et al.

(10) Patent No.: US 7,323,605 B2
(45) Date of Patent: Jan. 29, 2008

(54) DOUBLE METAL CYANIDE-CATALYZED, LOW UNSATURATION POLYETHERS FROM BORON-CONTAINING STARTERS

(75) Inventors: Jose F. Pazos, Charleston, WV (US); Kenneth G. McDaniel, Charleston, WV (US); Edward P. Browne, South Charleston, WV (US); George G. Combs, McMurray, PA (US); Don S. Wardius, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 130 days.

(21) Appl. No.: 11/270,100

(22) Filed: Nov. 9, 2005

(65) Prior Publication Data

US 2007/0106097 A1 May 10, 2007

(51) Int. Cl.
*C07C 41/03* (2006.01)
(52) U.S. Cl. ............... 568/679; 568/618; 568/698
(58) Field of Classification Search ............ 568/618, 568/679, 698
See application file for complete search history.

(56) References Cited

U.S. PATENT DOCUMENTS

| | | | |
|---|---|---|---|
| 3,560,539 A | 2/1971 | Booth et al. ............ 260/429 |
| 3,829,508 A | 8/1974 | Diery et al. ............ 260/615 B |
| 4,472,560 A | 9/1984 | Kuyper et al. ............ 526/120 |
| 5,470,813 A | 11/1995 | Le-Khac ............ 502/175 |
| 5,482,908 A | 1/1996 | Le-Khac ............ 502/156 |
| 5,712,216 A * | 1/1998 | Le-Khac et al. ............ 502/175 |
| 6,004,482 A * | 12/1999 | Adkins et al. ............ 252/400.62 |
| 6,063,897 A | 5/2000 | Le-Khac et al. ............ 528/410 |
| 6,077,978 A | 6/2000 | McDaniel et al. ............ 568/620 |
| 6,528,616 B1 | 3/2003 | Ooms et al. ............ 528/405 |
| 6,821,308 B2 | 11/2004 | Combs et al. ............ 44/443 |
| 7,005,552 B2 | 2/2006 | Kaushiva ............ 568/620 |
| 2005/0096488 A1 | 5/2005 | Kaushiva ............ 568/679 |
| 2005/0159628 A1 | 7/2005 | Stosser et al. ............ 568/679 |
| 2005/0209438 A1 | 9/2005 | Browne ............ 528/414 |

FOREIGN PATENT DOCUMENTS

| | | |
|---|---|---|
| EP | 1 591 466 A1 | 11/2005 |
| JP | 404211495 A * | 8/1992 |
| WO | 01/853381 A1 | 7/2001 |

* cited by examiner

*Primary Examiner*—Rosalynd Keys
(74) *Attorney, Agent, or Firm*—Lyndanne M. Whalen; John E. Mrozinski, Jr.

(57) ABSTRACT

The present invention provides a process for the double metal cyanide (DMC)-catalyzed production of low unsaturation polyethers from boron-containing starters. The polyethers produced by the inventive process may be reacted with one or more isocyanates to provide polyurethane products including coatings, adhesives, sealants, elastomers, foams and the like. The inventive process may be used to prepare fuel additives from $C_9$-$C_{30}$ boron-containing polyethers, more particularly from $C_{13}$ alcohols.

38 Claims, 1 Drawing Sheet

DOUBLE METAL CYANIDE-CATALYZED, LOW UNSATURATION POLYETHERS FROM BORON-CONTAINING STARTERS

FIELD OF THE INVENTION

The present invention relates in general to polyurethane-forming materials and more specifically to processes for the double metal cyanide ("DMC")-catalyzed production of polyether polyols from boron-containing starter molecules.

BACKGROUND OF THE INVENTION

Base-catalyzed oxyalkylation has been used to prepare polyoxyalkylene polyols for many years. In such a process, a suitably hydric starter molecule is oxyalkylated with one or more alkylene oxides, such as ethylene oxide ("EO") or propylene oxide ("PO"), to form a polyoxyalkylene polyether polyol product. Strongly basic catalysts such as sodium hydroxide or potassium hydroxide are typically used in such oxyalkylations.

Thus, most of polyoxyalkylene polyols useful in synthesis of polyurethane polymers, as well as those suitable for other uses, contain substantial amounts of oxypropylene moieties. As those skilled in the art are aware, during base-catalyzed oxypropylation, a competing rearrangement of propylene oxide to allyl alcohol generates monofunctional species which also become oxyalkylated, producing a wide range of polyoxyalkylene monols with molecular weights ranging from that of allyl alcohol itself or its low molecular weight oxyalkylated oligomers to polyether monols of very high molecular weight. In addition to broadening the molecular weight distribution of the product, the continuous generation of monols lowers the product functionality.

The monol content of polyoxyalkylene polyols is generally determined by measuring the unsaturation, for example by ASTM D-2849-69, "Testing of Urethane Foam Polyol Raw Materials", as each monol molecule contains allylic termination. Levels of unsaturation of about 0.025 meq/g to in excess of 0.10 meq/g for based-catalyzed polyols such as those described above are generally obtained. Numerous attempts have been made to lower unsaturation, and hence monol content, but few have been successful.

In the early 1960's, double metal cyanide ("DMC") complexes, such as the non-stoichiometric glyme complexes of zinc hexacyanocobaltate, were found which were able to prepare polyoxypropylene polyols with low monol contents, as reflected by unsaturation in the range of 0.012 to 0.020 meq/g. This represented a considerable improvement over the monol content obtainable by base catalysis.

In the 1970's, General Tire & Rubber Company, in U.S. Pat. No. 3,829,505, described the preparation of high molecular weight diols, triols etc., using double metal cyanide catalysts. However, the catalyst activity, coupled with catalyst cost and the difficulty of removing catalyst residues from the polyol product, prevented commercialization of the products.

In the 1980's, interest in such catalysts resurfaced, and improved catalysts with higher activity coupled with improved methods of catalyst removal allowed commercialization for a short time. The polyols also exhibited somewhat lower monol content, as reflected by unsaturation values in the range of 0.012 to 0.018 meq/g. However, the economics of the process were marginal, and in many cases, improvements expected in polymer products due to higher functionality and higher polyol molecular weight did not materialize.

In the 1990's, DMC catalysts were developed with far greater activity than was theretofore possible. Those catalysts, described for example in U.S. Pat. Nos. 5,470,813 and 5,482,908, allowed commercialization of DMC-catalyzed polyether polyols. Unlike the low (0.012-0.018 meq/g) unsaturation polyols prepared by prior DMC catalysts, these ultra-low unsaturation polyols often demonstrated dramatic improvements in polymer properties, although formulations were often different from the formulations useful with conventional polyols. These polyols typically have unsaturation in the range of 0.002 to 0.008 meq/g.

In U.S. Published Patent Application 2005-0159628 A1, Stosser et al. disclose that DMC-catalyzed reactions of $C_{13}$ alcohols with either butylene oxide ("BO") or propylene oxide produce monols containing surprisingly high levels of unsaturation. The following table reports the calculated unsaturation based upon the data (unsaturation mole %) taken from Table 1, at page 4 of Stosser et al. and charge factors.

| Exp. No. | Catalyst | Alkylene Oxide | Unsaturation (Mole %) | Calculated Unsaturation (meq/g) |
|---|---|---|---|---|
| 1 | KOH | PO | <1 | <0.006 |
| 2 | DMC | BO | 28.8 | 0.227 |
| 3 | DMC | BO | 21 | 0.149 |
| 4 | DMC | BO | 28.1 | 0.218 |
| 5 | DMC | BO | 27.1 | 0.207 |
| 6 | DMC | BO | 14.1 | 0.091 |
| 7 | DMC | PO | 4.2 | 0.04 |

These calculated unsaturation values are surprising because, as mentioned hereinabove, one of the key attributes of DMC catalysis is the production of polyether polyols with low levels of unsaturation. Typical unsaturation levels for DMC-based propylene oxide polyols are in the range of 0.003 to 0.012 meq unsaturation/g, and the corresponding butylene oxide-based products are in the range of 0.02 to 0.04 meq unsaturation/g. The disclosure of Stosser et al. is silent as to whether any special conditions were responsible for producing these high levels of unsaturation. Further, Stosser et al. do not teach how to control the production of the by-product unsaturation. As mentioned hereinabove, high levels of unsaturation are undesirable because the allyl or methallyl by-products can alter the characteristics of the resultant polyethers.

Although the present inventors have noticed that high levels of unsaturation are obtained when using certain $C_{13}$ alcohols containing trace amounts of boron compounds, other alcohols, such those from Shell's NEODOL series do not contain these boron residues and produce polyether polyols having unsaturation values in the range noted above. It appears that the problematic alcohols were treated with either sodium or potassium borohydride to prevent color formation during or after production and these residues interact with the DMC catalyst to cause the formation of the high levels of allylic alcohols. The polyether monols containing high levels of unsaturation are less desirable because a large fraction of the monols is initiated with allyl alcohols instead of with the $C_{13}$ alcohol. The $C_{13}$ alcohol-based product is desirable in certain application such as deposit control additives as the larger alkyl group is a major contributor to solubility characteristics of the polyether.

Combs and McDaniel in U.S. Pat. No. 6,821,308 teach the value of low unsaturation monols for use in fuel additive applications. In the background section of the '308 patent, polyethers terminated with an alkyl group ranging from $C_9C_{30}$ (more preferably) are said to have better solubility and compatibility with fuels. The products from Stosser et al. (entries 2-7, in the above table) have monols in the range of 4 to 28.8 percent that are terminated with either $C_3$ or $C_4$ allyl or methallyl groups. Thus, in the worst case, 28.8 percent of the polyethers would be terminated with the $C_4$ methallyl group instead of the more desirable $C_{13}$ and the $C_4$ group would decrease the compatibility with hydrocarbon fuels in comparison with a $C_{13}$-terminated polyether.

The addition of acids to facilitate other aspects of DMC-catalyzed processes is known to those skilled in the art (See, U.S. Pat. No. 6,077,978 and EP 1 577 334). The addition of acid in these processes is reported to enhance process stability and to allow certain low molecular weight starters to be used either in the continuous addition of starter ("CAOS") processes or in processes in which the starter is continuously added to the reactor during some part of the alkoxylation process. No effect on polyether unsaturation is noted in these references. Browne, in U.S. Published Patent Application 2005-0209438 A1, discloses the addition of acid to low molecular weight starter feed streams in a DMC-catalyzed CAOS process.

Although high unsaturation products are currently acceptable in fuel additive applications, the stringent emission and performance requirements of today's advanced engines can more easily be met with high performance polyethers that contain lower amounts of the unsaturated by-products. In addition, emission and performance requirements of tomorrow's engines will likely be more stringent and thus more difficult to satisfy with the currently available high unsaturation products. It would be desirable to have polyol production processes that can be used to prepare such polyether polyols with low unsaturation values from any source of alcohol.

SUMMARY OF THE INVENTION

Accordingly, the present invention provides a process for the production of a polyether involving adding to a boron-containing starter compound from about 0.75 equivalents to about 7 equivalents of an acid per equivalent of boron and polyoxyalkylating the boron-containing starter compound with an alkylene oxide in the presence of a double metal cyanide (DMC) catalyst.

The inventive process may be used to produce polyether polyols which may react with one or more isocyanates to provide polyurethane products including coatings, adhesives, sealants, elastomers, foams and the like. The process of the present invention may preferably be used to prepare fuel additives from $C_9$-$C_{30}$ boron-containing polyethers, particularly from $C_{13}$ boron-containing alcohols.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
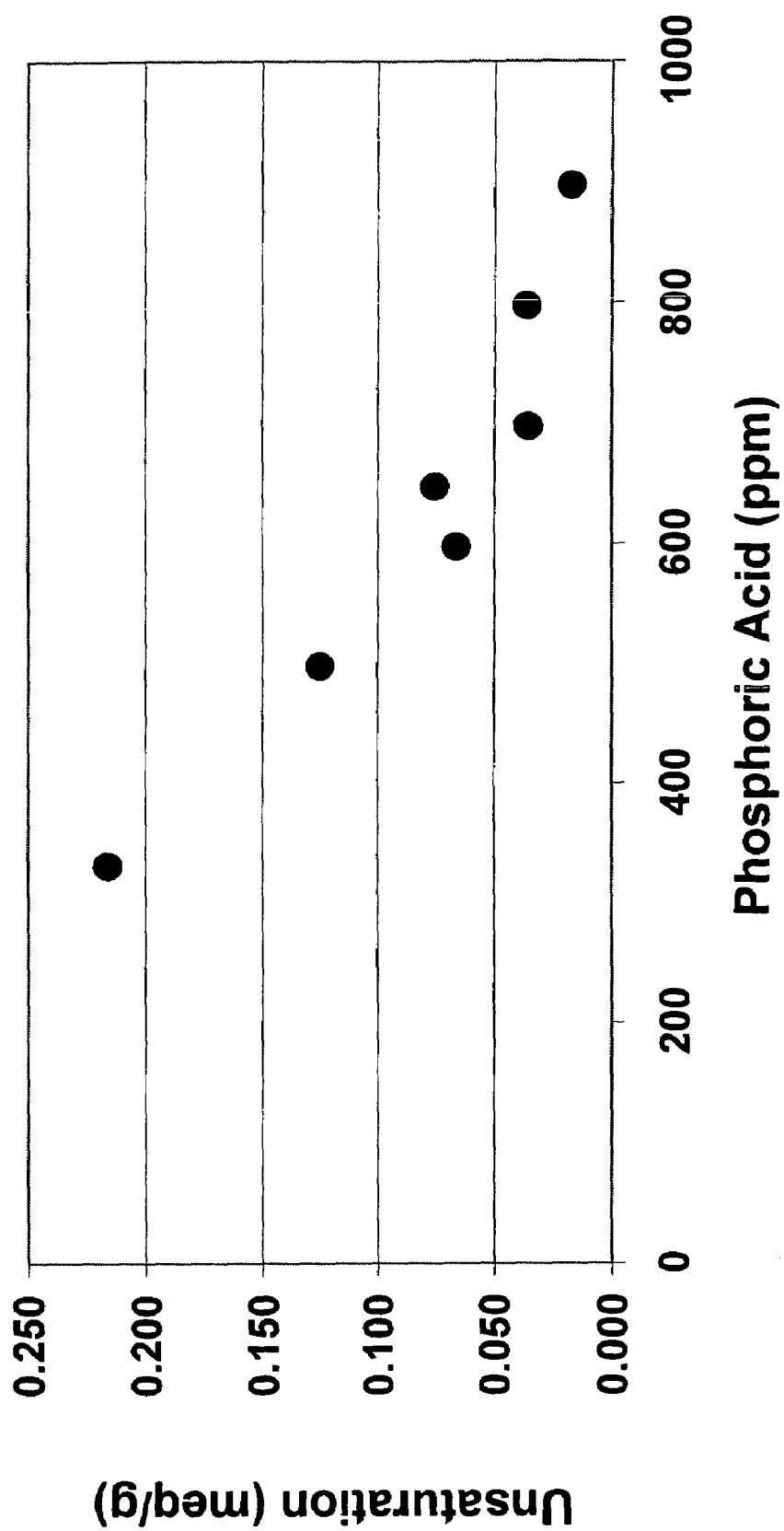
FIG. 1 illustrates a plot of unsaturation versus phosphoric acid added for the DMC-catalyzed production of a $C_{13}$ butylene oxide adduct.

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about."

The present inventors have discovered that the addition of an acid, such as phosphoric acid, to a boron-containing alcohol prior to the alkoxylation process reduces the amount of unsaturation formed during the alkoxylation.

The present invention, therefore, provides process for the production of a polyether polyol involving adding to a boron-containing starter compound from 0.75 equivalents to 7 equivalents of an acid per equivalent of boron and polyoxyalkylating the boron-containing starter compound with an alkylene oxide in the presence of a double metal cyanide (DMC) catalyst.

The present invention further provides process involving producing a fuel additive by adding to a boron-containing starter compound from 0.75 equivalents to 7 equivalents of an acid per equivalent of boron and polyoxyalkylating the boron-containing starter compound with an alkylene oxide in the presence of a double metal cyanide (DMC) catalyst.

Boron-containing alcohols useful in the inventive process are preferably $C_4$-$C_{40}$, more preferably $C_9$-$C_{30}$ and most preferably are $C_{13}$ alcohols. A semibatch process may preferably be used in which the boron-containing starter is added to the reactor prior to the start of the alkoxylation process. The boron-containing starter compound preferably has from 0.01 to 20 meq/kg, more preferably from 0.4 to 10 meq/g and most preferably from 1 to 8 meq/kg of boron compounds.

Although virtually any organic or inorganic acid may be used in the process of the present invention, useful acids include, but are not limited to, the mineral acids and the organic carboxylic acids, phosphonic acids, sulfonic acids, and combinations thereof. Phosphoric acid is particularly preferred as a mineral acid, whereas citric acid and 1,3,5-benzene tricarboxylic acids may be useful as organic acids. Acid derivatives which are reactive with bases, such as acid chlorides and acid anhydrides and the like, are also useful. Organic acids such as phosphonic acids, sulfonic acids, e.g. p-toluenesulfonic acid, and the like, may also be used. Examples of mineral acids which are suitable include hydrochloric acid, hydrobromic acid, and sulfuric acid, among others, while useful carboxylic acids or their acidifying derivatives include formic acid, oxalic acid, citric acid, acetic acid, maleic acid, maleic anhydride, succinic acid, succinic anhydride, adipic acid, adipoyl chloride, adipic anhydride, and the like. Inorganic acid precursors such as thionyl chloride, phosphorous trichloride, carbonyl chloride, sulfur trioxide, thionyl chloride phosphorus pentoxide, phosphorous oxytrichloride, and the like are considered as mineral acids herein.

The amount of acid added in the inventive process is that needed for the neutralization of the boron compounds contained in the starter molecule, i.e., from 0.75 to 7 equivalents, more preferably from 0.8 to 5 equivalents and most preferably from 0.95 to 4 equivalents of acid per equivalent of boron. For phosphoric acid, the preferred range of acid addition is in the range of 1 to 7 equivalents of acid, more preferably from 2 to 5 equivalents of acid, and most preferably from 2.5 to 4.5 equivalents of acid per equivalent of boron. As the $C_{13}$ alcohol used in the examples herein contained about 6 meq/kg of boron compounds, the preferred amount of phosphoric acid was in the range of 700-900 ppm. The acid may be added in the process of the present invention in an amount ranging between any combination of the above-recited values, inclusive of the recited values.

The alkylene oxides useful in the inventive process include, but are not limited to, ethylene oxide, propylene oxide, 1,2- and 2,3-butylene oxide, isobutylene oxide, epichlorohydrin, cyclohexene oxide, styrene oxide, and the higher alkylene oxides such as the $C_5$-$C_{30}$ α-alkylene oxides. Although mixtures of alkylene oxides may be used, propylene oxide alone or butylene oxide alone are particularly preferred. Other polymerizable monomers may be used as well, e.g. anhydrides and other monomers as disclosed in U.S. Pat. Nos. 3,404,109, 3,538,043 and 5,145,883, the contents of which are herein incorporated in their entireties by reference thereto.

The process of the present invention may employ any double metal cyanide (DMC) catalyst. Double metal cyanide complex catalysts are non-stoichiometric complexes of a low molecular weight organic complexing agent and optionally other complexing agents with a double metal cyanide salt, e.g. zinc hexacyanocobaltate. Suitable DMC catalysts are known to those skilled in the art. Exemplary DMC catalysts include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922 the contents of which are incorporated herein in their entireties by reference thereto. The DMC catalysts more preferred in the process of the present invention are those capable of preparing "ultra-low" unsaturation polyether polyols. Such catalysts are disclosed in U.S. Pat. Nos. 5,470,813 and 5,482,908, 5,545,601, 6,689,710 and U.S. Published Patent Application No. 2004-0044240-A1, the contents of which are herein incorporated in their entireties by reference thereto. Particularly preferred in the inventive process are those zinc hexacyanocobaltate catalysts prepared by the methods described in U.S. Pat. No. 5,482,908. Polyols and fuel additives prepared according to the process of the instant invention preferably have unsaturation levels of less than 0.05 meq/g, more preferably less than 0.04 meq/g.

The DMC catalyst concentration is chosen so as to ensure good control of the polyoxyalkylation reaction under the given reaction conditions. The catalyst concentration is preferably in the range from 0.0005 wt. % to 1 wt. %, more preferably in the range from 0.001 wt. % to 0.1 wt. %, most preferably in the range from 0.001 to 0.01 wt. %, based on the amount of polyether to be produced. The DMC catalyst may be present in the process of the present invention in an amount ranging between any combination of these values, inclusive of the recited values.

EXAMPLES

The present invention is further illustrated, but is not to be limited, by the following examples.

Examples 1-13

Reactions with butylene oxide were conducted in a one-liter PAAR autoclave (heavy walled, stainless steel vessel). The starter molecule was a $C_{13}$ alcohol (EXXAL-13 from Exxon). This starter molecule was mixed with 334 ppm of phosphoric acid for ten minutes, after which, the appropriate amount of DMC catalyst (prepared according to U.S. Pat. No. 5,482,908) was added. The resultant mixture was charged to the PARR reactor, heated to 90° C., and stripped for one half hour at 4.9 psia with a nitrogen sweep. The temperature was raised to 130° C. and enough butylene oxide was added to produce a polyol with a molecular weight of 800.

Table I below summarizes the unsaturation values for 70 hydroxyl number polyols made with 334 ppm of acid added to the starter.

TABLE I

| Ex. No. | Unsaturation (meq/g) |
|---|---|
| 1 | 0.157 |
| 2 | 0.155 |
| 3 | 0.172 |
| 4 | 0.327 |
| 5 | 0.238 |
| 6 | 0.246 |
| 7 | 0.191 |
| 8 | 0.271 |
| 9 | 0.230 |
| 10 | 0.225 |
| 11 | 0.223 |
| 12 | 0.192 |
| 13 | 0.167 |
| Avg. | 0.215 |
| Mole % | 17 |

Examples 14-20

The procedure of Example 1 was repeated, except with the addition of 500 ppm, 600 ppm, 650 ppm, 700 ppm, 800 ppm and 900 ppm phosphoric acid, to make a series of 70 hydroxyl number polyols. Those resykts are summarized below in Table II.

TABLE II

| Ex. No. | Phosphoric Acid (ppm) | Unsaturation (meq/g) |
|---|---|---|
| 14 | 500 | 0.124 |
| 15 | 600 | 0.065 |
| 16 | 650 | 0.074 |
| 17 | 700 | 0.0356 |
| 18 | 700 | 0.0331 |
| 19 | 800 | 0.035 |
| 20 | 900 | 0.016 |

Table III below summarizes the unsaturation values in meq/g and mole percent for the various amounts of phosphoric acid added.

TABLE III

| Phosphoric Acid (ppm) | Unsaturation (meq/g) | Unsaturation (mole %) |
|---|---|---|
| 334 | 0.215* | 17 |
| 500 | 0.124 | 10 |
| 600 | 0.065 | 5 |
| 650 | 0.074 | 6 |
| 700 | 0.034* | 3 |
| 800 | 0.035 | 3 |
| 900 | 0.016 | 1 |

*values are averages

When these unsaturation values were plotted against the amount in ppm of acid (FIG. 1), it became apparent that the unsaturation value decreased to a certain point and thereafter remained fairly constant.

Examples 21 and 22

A 35 hydroxyl number polyol was prepared by the process of Example 1 with the addition of 334 ppm of acid and the unsaturation was 0.249 meq/g or 39 mole percent. The same 35 hydroxyl number polyol prepared with 700 ppm of phosphoric acid added had an unsaturation vakye if 0.0385 meq/g or 6 mole percent.

Examples 23-26

Polyols (70 and 35 hydroxyl number) were made from the same $C_{13}$ alcohol (EXXAL-13 from Exxon), as starter according to the procedure of Example 1, except that propylene oxide was used as the alkylene oxide instead of butylene oxide. The polyols were made at two different phosphoric acid addition levels, i.e., 334 ppm and 800 phosphoric acid. The products were analyzed and the results are summarized below in Table IV.

TABLE IV

| Ex. No. | OH # (expected) | Phosphoric Acid (ppm) | OH # (actual) | Unsaturation (meq/g) |
|---|---|---|---|---|
| 23 | 70 | 334 | 72.4 | 0.0099 |
| 24 | 70 | 800 | 69.4 | 0.0037 |
| 25 | 35 | 334 | 38.3 | 0.0093 |
| 26 | 35 | 800 | 34.6 | 0.0029 |

The polyether polyols produced by the process of the present invention may be reacted with one or more isocyanates to provide polyurethane products such as coatings, adhesives, sealants, elastomers, foams and the like. The inventive process may preferably be used to prepare fuel additives from $C_9$-$C_{30}$ boron-containing polyethers, more preferably from $C_{13}$ boron-containing alcohols.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A process for the production of a polyether polyol comprising: adding to a boron-containing starter compound from about 0.75 equivalents to about 7 equivalents of an acid per equivalent of boron; and
polyoxyalkylating the boron-containing starter compound with an alkylene oxide in the presence of a double metal cyanide (DMC) catalyst, wherein the boron-containing starter compound is a $C_4$-$C_{40}$ alcohol.

2. The process according to claim 1, wherein the boron-containing starter compound is a $C_9$-$C_{30}$ alcohol.

3. The process according to claim 1, wherein the boron-containing starter compound is a $C_{13}$ alcohol.

4. The process according to claim 1, wherein the boron-containing starter compound comprises from about 0.01 to about 20 meq/kg of boron compounds.

5. The process according to claim 1, wherein the boron-containing starter compound comprises from about 0.4 to about 10 meq/kg of boron compounds.

6. The process according to claim 1, wherein the boron-containing starter compound comprises from about 1 to about 8 meq/kg of boron compounds.

7. The process according to claim 1, wherein about 0.8 equivalents to about 5 equivalents of acid is added per equivalent of boron.

8. The process according to claim 1, wherein about 0.95 equivalents to about 4 equivalents of acid is added per equivalent of boron.

9. The process according to claim 1, wherein the acid is chosen from mineral acids, organic carboxylic acids, phosphonic acids, sulfonic acids and combinations thereof.

10. The process according to claim 1, wherein the acid is chosen from citric acid, 1,3,5-benzene tricarboxylic acids, phosphonic acids, p-toluenesulfonic acid, hydrochloric acid, hydrobromic acid, sulfuric acid, formic acid, oxalic acid, acetic acid, maleic acid, maleic anhydride, succinic acid, succinic anhydride, adipic acid, adipoyl chloride, adipic anhydride, thionyl chloride, phosphorous trichloride, carbonyl chloride, sulfur trioxide, thionyl chloride phosphorus pentoxide, phosphorous oxytrichloride and combinations thereof.

11. The process according to claim 1, wherein the acid is phosphoric acid.

12. The process according to claim 1, wherein from about 1 to about 7 equivalents of phosphoric acid are added per equivalent of boron.

13. The process according to claim 1, wherein from about 2 to about 5 equivalents of phosphoric acid are added per equivalent of boron.

14. The process according to claim 1, wherein from about 2.5 to about 4.5 equivalents of phosphoric acid are added per equivalent of boron.

15. The process according to claim 1, wherein the alkylene oxide is chosen from ethylene oxide, propylene oxide, 1,2- and 2,3-butylene oxide, isobutylene oxide, epichlorohydrin, cyclohexene oxide, styrene oxide and $C_5$-$C_{30}$ α-alkylene oxides.

16. The process according to claim 1, wherein the alkylene oxide is chosen from propylene oxide, 1,2- and 2,3-butylene oxide and isobutylene oxide.

17. The process according to claim 1, wherein the DMC catalyst is a zinc hexacyanocobaltate.

18. The process according to claim 1, wherein the unsaturation of the polyether is less than about 0.05 meq/g.

19. The process according to claim 1, wherein the unsaturation of the polyether is less than about 0.04 meq/g.

20. In a process of producing one of a polyurethane coating, adhesive, sealant, elastomer and foam, the improvement comprising including the polyether polyol by the process according to claim 1.

21. A process comprising:
producing a fuel additive by adding to a boron-containing starter compound from about 0.75 equivalents to about 7 equivalents of an acid per equivalent of boron;
and polyoxyalkylating the boron-containing starter compound with an alkylene oxide in the presence of a double metal cyanide (DMC) catalyst, wherein the boron-containing starter compound is a $C_9$-$C_{30}$ alcohol.

22. The process according to claim 21, wherein the boron-containing starter compound is a $C_{13}$ alcohol.

23. The process according to claim 21, wherein the boron-containing starter compound comprises from about 0.01 to about 20 meq/kg of boron compounds.

24. The process according to claim 21, wherein the boron-containing starter compound comprises from about 0.4 to about 10 meq/kg of boron compounds.

25. The process according to claim 21, wherein the boron-containing starter compound comprises from about 1 to about 8 meq/kg of boron compounds.

26. The process according to claim 21, wherein about 0.8 equivalents to about 5 equivalents of acid is added per equivalent of boron.

27. The process according to claim 21, wherein about 0.95 equivalents to about 4 equivalents of acid is added per equivalent of boron.

28. The process according to claim 21, wherein the acid is chosen from mineral acids, organic carboxylic acids, phosphonic acids, sulfonic acids and combinations thereof.

29. The process according to claim 21, wherein the acid is chosen from citric acid, 1,3,5-benzene tricarboxylic acids, phosphonic acids, p-toluenesulfonic acid, hydrochloric acid, hydrobromic acid, sulfuric acid, formic acid, oxalic acid, acetic acid, maleic acid, maleic anhydride, succinic acid, succinic anhydride, adipic acid, adipoyl chloride, adipic anhydride, thionyl chloride, phosphorous trichloride, carbonyl chloride, sulfur trioxide, thionyl chloride phosphorus pentoxide, phosphorous oxytrichloride and combinations thereof.

30. The process according to claim 21, wherein the acid is phosphoric acid.

31. The process according to claim 21, wherein from about 1 to about 7 equivalents of phosphoric acid are added per equivalent of boron.

32. The process according to claim 21, wherein from about 2 to about 5 equivalents of phosphoric acid are added per equivalent of boron.

33. The process according to claim 21, wherein from about 2.5 to about 4.5 equivalents of phosphoric acid are added per equivalent of boron.

34. The process according to claim 21, wherein the alkylene oxide is chosen from ethylene oxide, propylene oxide, 1,2- and 2,3-butylene oxide, isobutylene oxide, epichlorohydrin, cyclohexene oxide, styrene oxide and $C_5$-$C_{30}$ α-alkylene oxides.

35. The process according to claim 21, wherein the alkylene oxide is chosen from propylene oxide, 1,2- and 2,3-butylene oxide and isobutylene oxide.

36. The process according to claim 21, wherein the DMC catalyst is a zinc hexacyanocobaltate.

37. The process according to claim 21, wherein the unsaturation of the fuel additive is less than about 0.05 meq/g.

38. The process according to claim 21, wherein the unsaturation of the fuel additive is less than about 0.04 meq/g.

* * * * *